Nov. 26, 1940.  B. L. QUARNSTROM  2,223,270
METHOD AND APPARATUS FOR MAKING TUBE
Filed Sept. 8, 1938   5 Sheets-Sheet 1
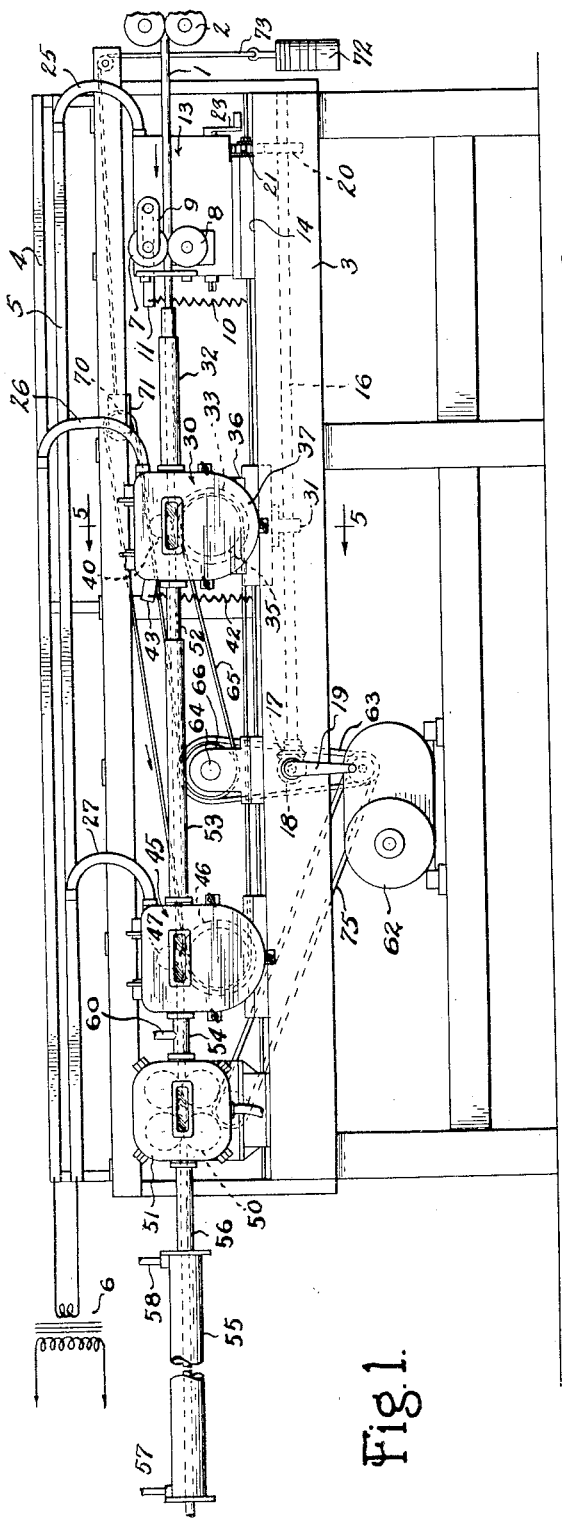
Fig. 1.
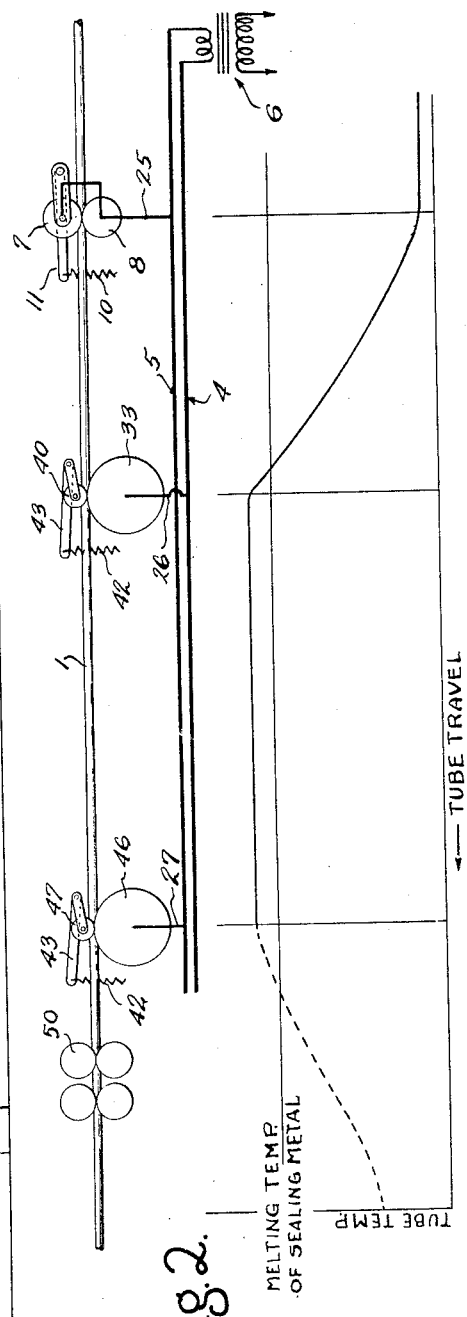
Fig. 2.
INVENTOR.
Bert L. Quarnstrom
BY 
ATTORNEYS Nov. 26, 1940.  B. L. QUARNSTROM  2,223,270
METHOD AND APPARATUS FOR MAKING TUBE
Filed Sept. 8, 1938  5 Sheets-Sheet 2

INVENTOR.
Bert L. Quarnstrom
BY Barnes, Kisselle, Laughlin & Raisch
ATTORNEYS

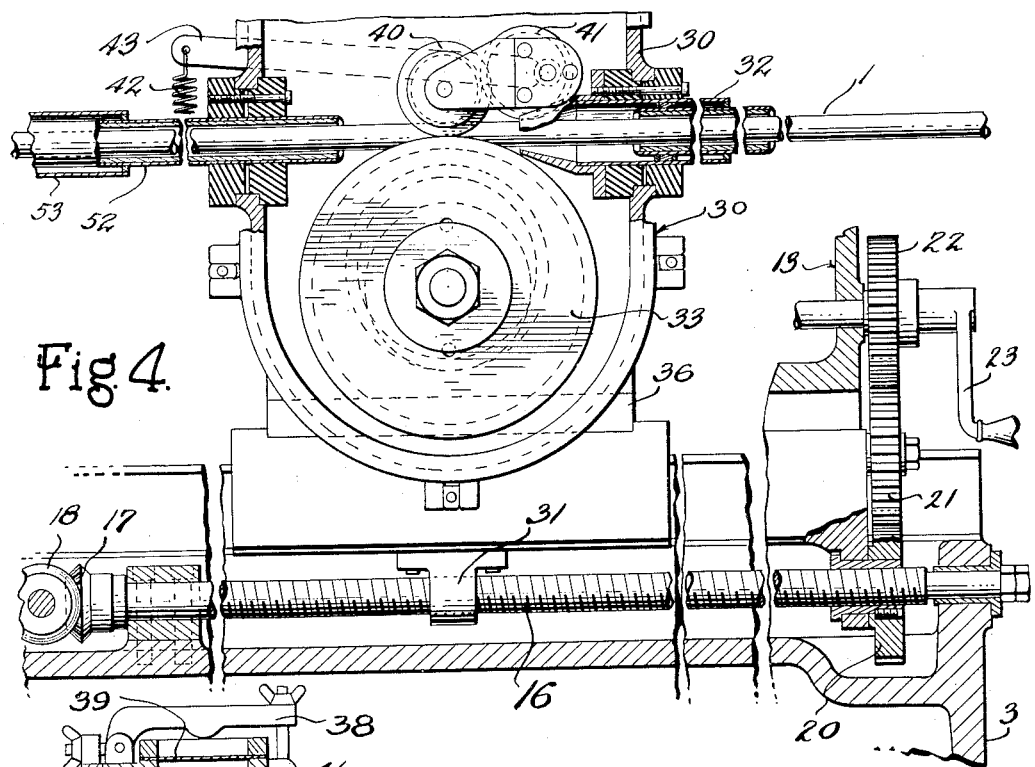
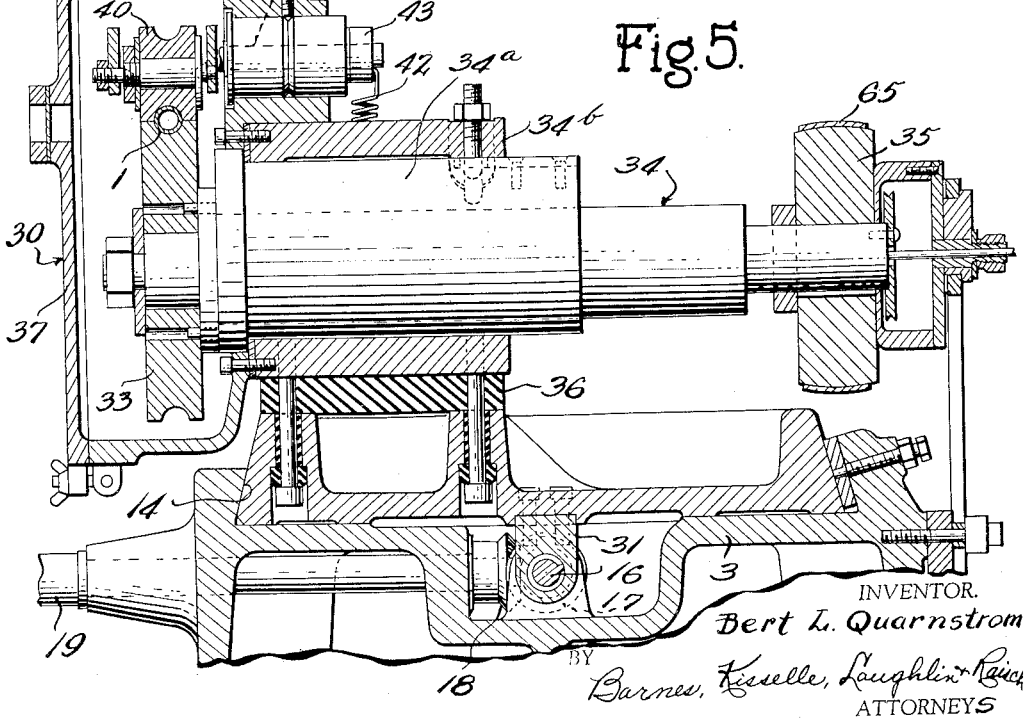

Nov. 26, 1940.                B. L. QUARNSTROM                2,223,270
                    METHOD AND APPARATUS FOR MAKING TUBE
                    Filed Sept. 8, 1938          5 Sheets-Sheet 4
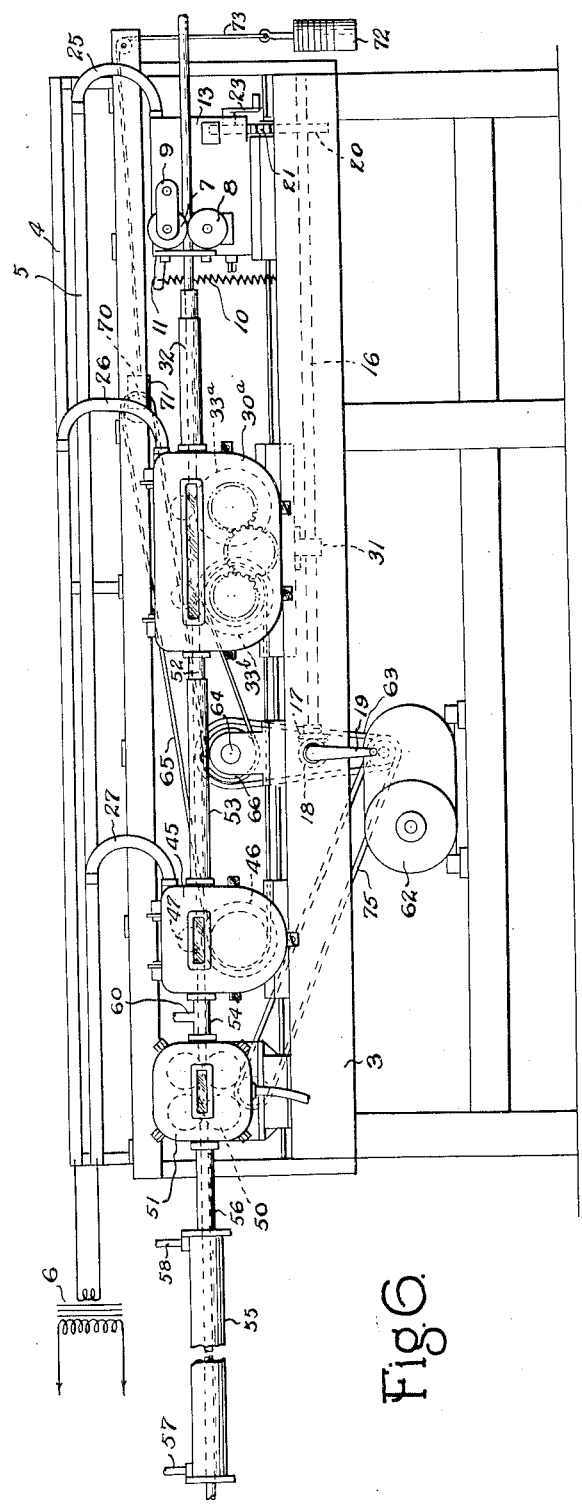
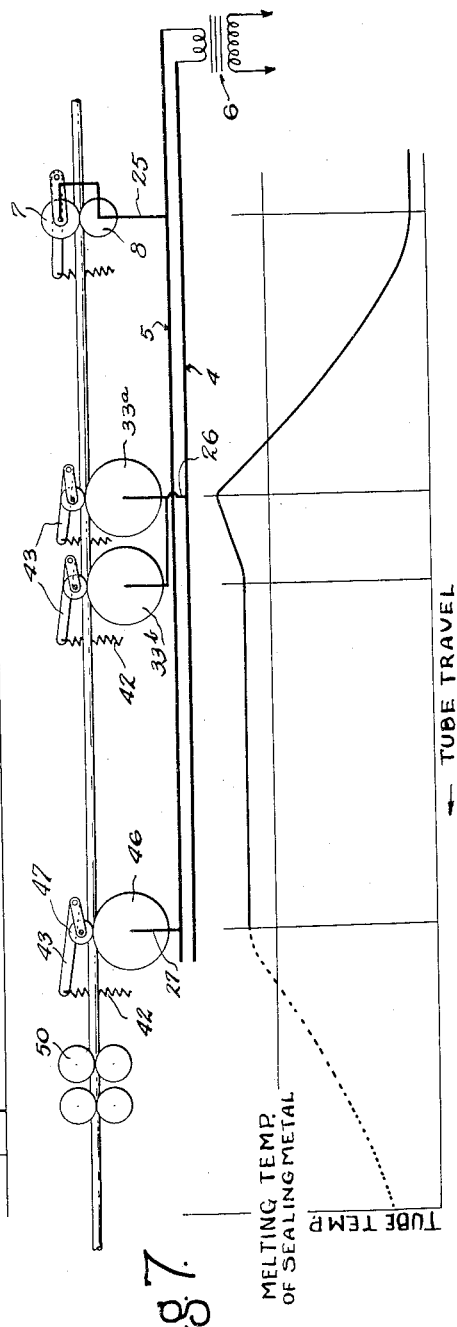
INVENTOR.
Bert L. Quarnstrom
BY
Barnes, Kisselle, Laughlin & Raisch
ATTORNEYS

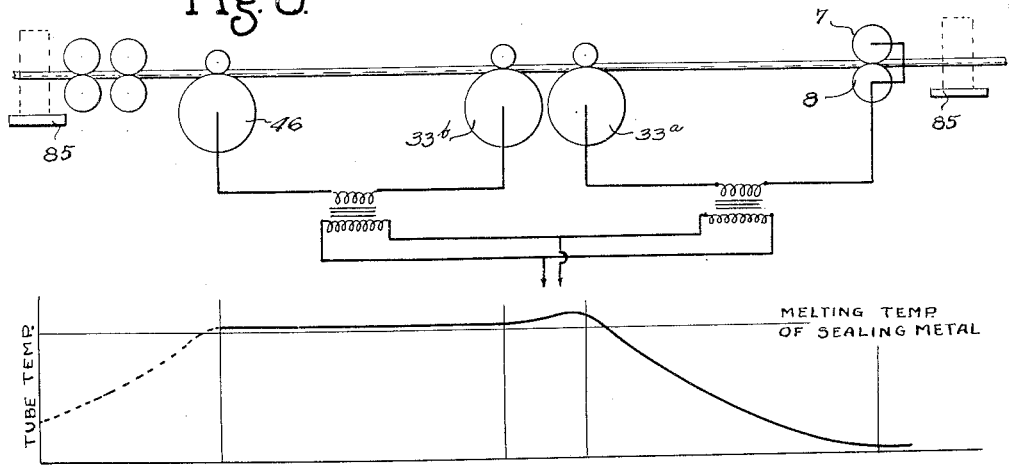
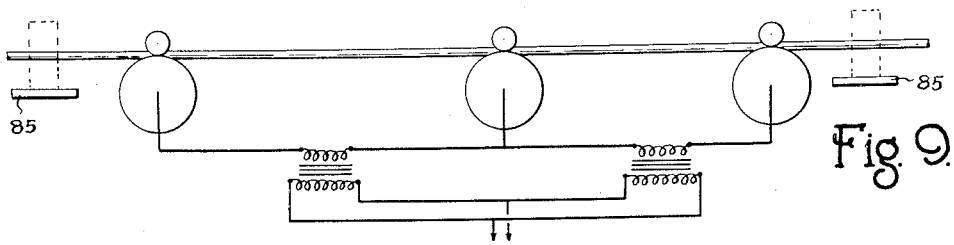
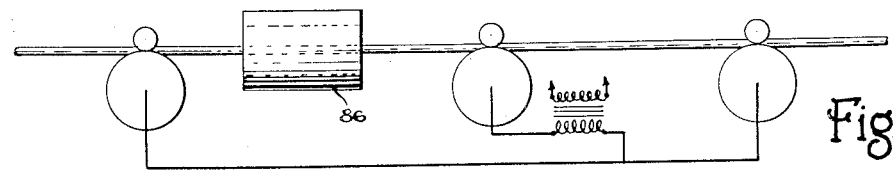
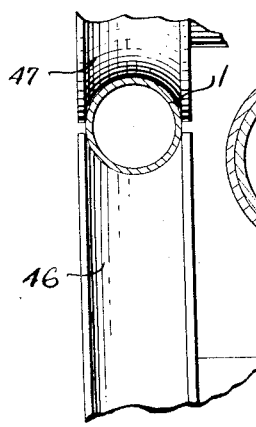
Fig. 11.
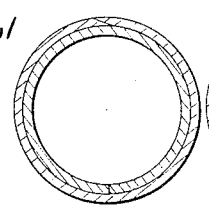
Fig. 12.
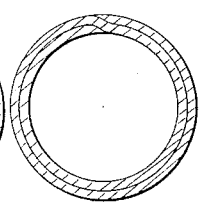
Fig. 13.
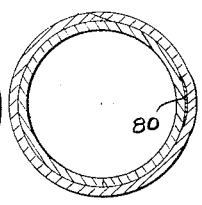
Fig. 14.
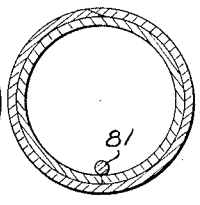
Fig. 15.
INVENTOR.
Bert L. Quarnstrom
BY
Barnes Kisselle, Laughlin & Raisch
ATTORNEYS Patented Nov. 26, 1940

2,223,270

UNITED STATES PATENT OFFICE 2,223,270

METHOD AND APPARATUS FOR MAKING TUBE

Bert L. Quarnstrom, Detroit, Mich., assignor to Bundy Tubing Company, Detroit, Mich., a corporation of Michigan Application September 8, 1938, Serial No. 229,015

7 Claims. (Cl. 219—12)

This invention relates to the making of tubing and particularly to tubing fashioned from strip metal stock wherein the stock has overlapping or juxta-positioned parts with contiguous surfaces which are united to seal the tube.

The invention is directed particularly to improvements in the making of such tube where the tube is travelling longitudinally, and heat generated by electrical resistance effects the uniting of the overlapping parts. The surfaces of the overlapping parts, or other portions which come into engagement with each other, such as abutting edges in the seam or the like, are united by fused metal. The invention is admirably adapted to the making of tubing where the body of the tube is formed of strip stock of one metal, and the uniting of the overlapping or juxta-positioned parts is effected by one or more other metals having a melting point lower than the melting point of the strip stock. Accordingly, this sealing metal is carried into position as the tube moves so that when the structure is subjected to heat to melt the sealing metal, such sealing metal fills in between the overlapping parts or between other juxta-positioned parts of the strip stock to unite such parts upon solidification. The sealing metal may be carried into position in one of several manners, as for example, by coating some of the strip with the sealing metal or by introducing the sealing metal in the form of a separate wire or strip, or in powder form.

Various metals may be used in the formation of tube by the apparatus and process of this invention. For example, the strip stock which forms the body of the tube may be ferrous metal such as low carbon steel, and the sealing metal may be a soft or hard solder such as a tin and lead alloy, a brazing metal such as a cuprous metal, or substantially pure copper. The strip from which the tube is made may be metal other than steel such as copper or brass, or metal such as copper-nickel alloy or various steel alloys, and the sealing metal may be selected with due regard to the metal of the strip, to the end that the sealing metal selected functions properly with the metal of the strip stock and has a lower melting point.

In the making of tube in this way the tube travels longitudinally with a considerable speed. For example, tube fashioned from steel stock and sealed with copper has been made at the rate of about 120 feet per minute. The tube runs in contact with longitudinally spaced electrodes and the tube is rapidly brought up to the melting temperature of the sealing metal. This invention has as a particular object the provision of an arrangement for maintaining the sealing metal in a molten condition and maintaining the tube in a hot condition for a suitable time period, notwithstanding the fact that the tube is moving rapidly and is rapidly brought up to or above the melting temperature of the sealing metal. This permits the sealing metal to establish an interfacial connection with the strip as by the diffusion of the metals or the forming of an alloy, and provides adequate time for the sealing metal to flow into position where the sealing metal is supplied in such a manner that a flow is required. To this end a multiple electrode arrangement is provided so that different sections of the tube bridge different electrodes at a given time. Some electrodes are arranged so that the electrical current brings the tube structure up to the desired temperature; others are arranged to substantially maintain the desired temperature for the desired time period. Suitable adjustments may be made to govern the current flow in the tube sections and to govern the temperatures obtained in those sections.

With some metals such as copper or cuprous metal or the like, it is desirable to carry out much of the operation in the reducing or non-oxidizing atmosphere. Such an atmosphere may not be necessary with some metals. With some metals such as a solder comprising a tin and lead alloy, a suitable flux may be used instead of a reducing or non-oxidizing atmosphere. Since the tube is heated by the passing of an electrical current therethrough, the process is admirably adapted to the making of steel tube, particularly with a relatively high melting point sealing metal such as copper. Where tube is made from strip stock which is a better conductor than steel, the electrical current, of course, will have to be varied to properly heat such strip; where, for example, copper strip is used with a soft solder such as a lead and tin alloy used, the temperature attained does not have to be so high.

One form of apparatus, with several modifications indicated, for carrying out the invention is shown in the accompanying drawings. In these drawings:

Fig. 1 is a side elevational view of an apparatus for carrying out the invention with some of the parts shown rather diagrammatically.

Fig. 2 is a diagrammatic illustration showing the temperature curve which may be obtained with the apparatus shown in Fig. 1.

Fig. 4 is an enlarged detail view illustrating one of the electrode arrangements.

Fig. 5 is an enlarged cross sectional view taken substantially on line 5—5 of Fig. 1.

Fig. 6 is a side elevational view similar to Fig. 1 showing a modified form.

Fig. 7 is a view illustrating a temperature curve which may be obtained with the structure shown in Fig. 6.

Fig. 8 is a diagrammatic view illustrating a different arrangement of electrical circuits for electrodes of the type shown in Fig. 7, and illustrating a temperature curve obtained with such an arrangement.

Fig. 9 is a view of another arrangement of the circuit for electrodes of the type shown in Fig. 2.

Fig. 10 is a view of a modified arrangement for relatively controlling the flow of current in the tube sections.

Fig. 11 is a cross sectional view taken through some of the electrodes.

Fig. 12 is a sectional view illustrating one form of tube which may be made.

Fig. 13 is a sectional view showing another form of tube which may be made.

Fig. 14 is a sectional view of a tube structure showing one way of carrying the sealing metal.

Fig. 15 is a sectional view of a tube structure showing another manner of carrying the sealing metal into position.

Figure 3:
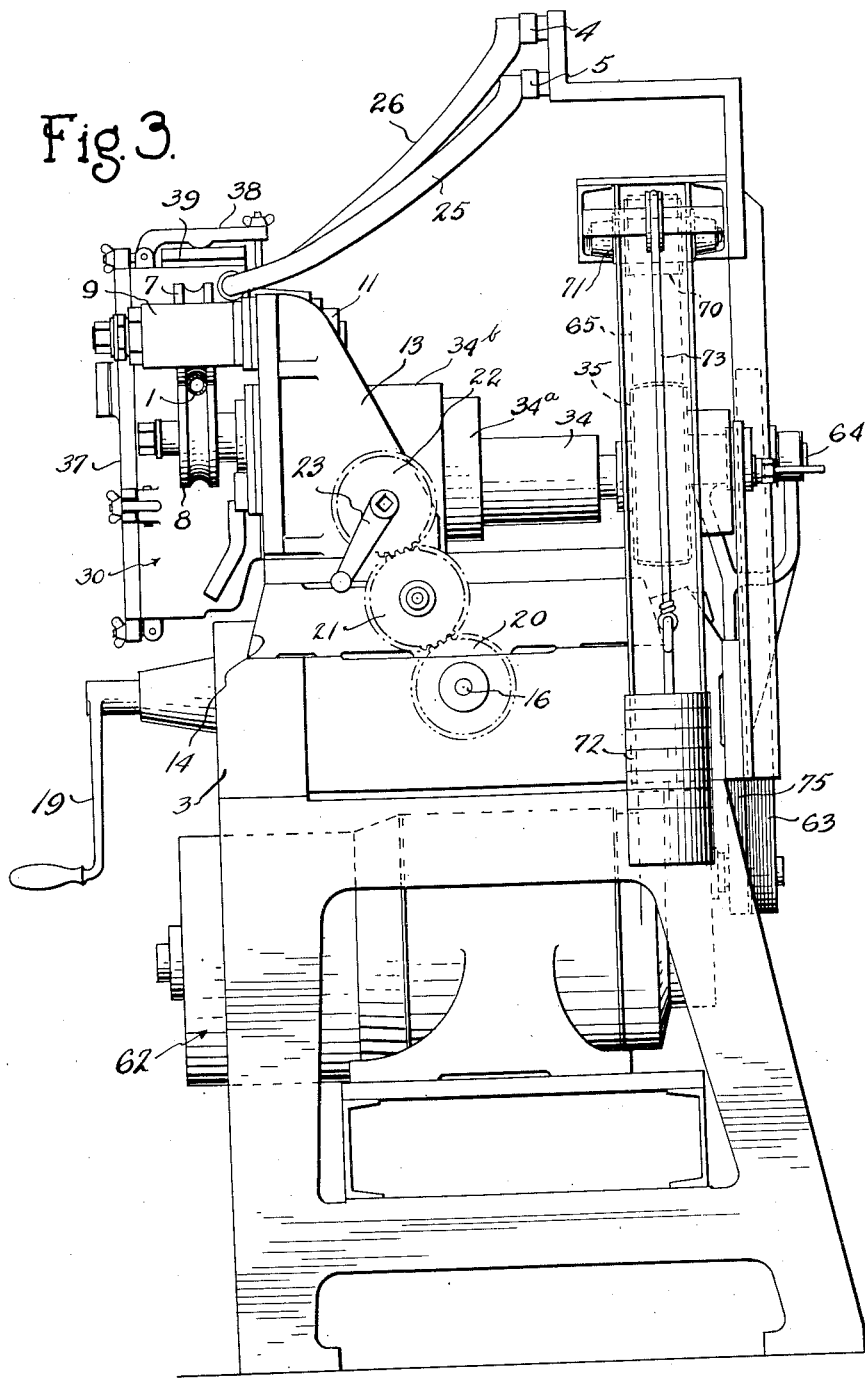
Fig. 3 is an end elevational view of the apparatus shown in Fig. 17 taken from the right hand end therof.

Various tube structures may be made in practicing this invention, such as tube with multiply walls as the tubes shown in Figs. 12 to 15, inclusive, having inner and outer plies, or tubes having but a single ply with a lock seam or a lap seam or the like. These tube structures are well known to those versed in the art and need not be shown in detail other than those illustrated herein, and tube mills for making such tube from strip stock are also well known to those versed in the art. The tube, in the process of manufacture, may pass directly from the tube mill into the apparatus for sealing of the tube. A tube mill is not shown herein except for a pair of rolls 2 which may be the final rolls of a tube mill.

The tube to be worked upon is illustrated at 1 and it is passed to the left as Fig. 1 is viewed. The apparatus comprises a suitable table or support 3 which may carry bus bars 4 and 5 for conducting the welding current. A suitable transformer is illustrated at 6.

The tube first passes through or in contact with electrodes preferably in the form of rollers as illustrated at 7 and 8, and these are preferably of metal and may be idler rollers caused to revolve by reason of their contact with the tube. The lower roll may be fixed as to position while the upper roll 7 may be mounted on a pivotally mounted arm 9, and may be acted upon by a spring 10 for holding the upper roll in yielding engagement with the tube. The spring may act through an arm 11 which is fixedly secured to the arm 9 at the pivotal mounting.

These two electrodes are supported by a carrier 13 which is slidable in guideways 14 of the support 3. Journaled in the support 3 is a screw-threaded shaft 16. This shaft has a miter gear 17 meshing with a miter gear 18 on a stub shaft equipped with a handle 19. The carrier 13 is connected to the screw shaft 16 for adjustment purposes. To this end the carrier has a gear 20 (Figs. 1, 3 and 4) with a rotary hub journaled in the carrier 13 and having a screw-threaded connection with the shaft. The carrier also has a gear 21 and a gear 22 equipped with a turning handle 23. It will be noted that upon turning of the shaft 16 by the handle 19 the carrier may be shifted lengthwise of the screw shaft; that if the screw shaft is not turned the carrier may be adjusted lengthwise thereof by the turning of the handle 23 and therefore the gear 20. The electrodes are connected to the electrical circuit by a flexible conductor 25. This arrangement will be termed the first electrode.

Another electrode, which may be termed the second electrode, is connected to the opposite side of the circuit by a flexible conductor 26, the connection being to the bus bar 4. The second electrode is disposed in a housing 30 which, with the journal assembly illustrated on Fig. 5, is mounted in the ways 14 and has a depending element 31 with a screw threaded engagement with the shaft 16 (Fig. 4). The housing has a tubular extension 32 which preferably comprises extensible telescoping parts, as illustrated, through which the tube 1 passes. The electrode is preferably in the form of a grooved metallic wheel 33 mounted upon an axis 34 provided with a driving pulley 35 and journaled in bushing 34a which is clamped in block 34b. This electrode is insulated from the base of the carriage by insulation 36 (Fig. 5). One side of the housing may comprise a removable plate 37 for access into the same, while the top of the housing comprises an element held down by a clamp 38 which holds a thin piece of material 39 in place. This material may be mica or the like and arranged to burst in the case of any difficulty such as an explosion or excess pressure in the housing.

The tube 1 passes over the electrode roller 33 and is held in contact with the same by a roller 40 pivotally mounted as at 41 and held down by a spring 42 acting upon an arm 43. The roller 40 is preferably of graphite or carbon.

A further electrode, termed the third electrode, is mounted in a housing 45 and this electrode and housing may be substantially identical with the electrode 33 and housing 30. The housing 45 may be carried by the ways 14 of the support and while the housing 45 may be made so that it is adjustable by a hand operation lengthwise of the support, it is not necessarily made quickly adjustable. This electrode comprises an electrode roller 46 and a carbon hold-down roller 47 with the electrode connected to the bus bar 5 by a flexible conductor 27. The grooves in the rollers 46 and 47, are preferably on a slightly smaller radius than the outside diameter of the tube, as illustrated in Fig. 11, the purpose of which will presently appear.

A set of pulling rolls 50 may be mounted in a retainer or housing 51 likewise supported by the support 3 for engaging and aiding in advancing the tube. However, as the tube is propelled by the mill and by the driven electrodes, this pulling unit may or may not be used, depending upon whether or not such additional pulling unit appears desirable or necessary.

The tube is preferably confined in its passage, particularly in those portions of the path where it is hot. To this end the housings 30 and 45 are connected together by a tubular structure preferably of heat insulating material, one tubular structure at 52 being connected to the housing 30 and another tubular structure 53 being connected to the housing 45, and these tubes are telescopingly interfitted so that the housings may be adjusted relative to each other. A tubular structure 54 connects housing 45 and housing 51. A quenching bath is illustrated at 55, the tube preferably being confined in a pipe 56 as it passes to the quenching structure and a suitable quenching liquid may be introduced through a pipe 57 and passed off through a pipe 58.

In some instances where it is desired to maintain a reducing or non-oxidizing gas around the hot tube, such gas may be introduced through the pipe 60 and it may burn off at the entrance end of the tubular structure 32 and at the outlet end of the cooler. Where a non-oxidizing environment is not to be maintained, the gas inlet 60 may be dispensed with or plugged.

Certain of the rollers and electrodes are driven, for which purpose a motor 62 supplies the power through the means of a belt or silent chain 63 which drives shaft 64. A belt 65 operates over a pulley 66 of the shaft 64, over the pulley 35 of the electrode 33 (Fig. 5), over a corresponding pulley of the electrode 46, and over a pulley 70 mounted on a slidable block 71, held retracted by suitable means such as a weight 72 suspended from a cable 73 which is connected to the block. The weight keeps the belt taut and yet permits adjustment, because the weight raises and lowers as the necessity arises for shift of the pulley 70, due to the shortening or extending of the distance over which the belt operates. The motor 62 also drives the feeding rollers 50 through the means of a belt or chain 75.

Before proceeding with some of the modified arrangements it is thought best to explain the operation and function of the machine and method, in connection with which some electrical apparatus will be described. Consider, for example, a tube structure such as shown in Fig. 12 where two strips of stock are fashioned into multiply tube, the stock being steel and the strip forming the inner ply having a coating of copper thereon. This copper may be applied electrolytically or in any other suitable manner. The tube passes in contact with the first electrode 7—8 and successive sections of the tube are heated in the space between the first electrode and the second electrode 33. In the space between the electrode 33 and the third electrode 46 the heat is substantially maintained. A temperature curve may be substantially as illustrated in Fig. 2 where it will be noted that the temperature is raised to a point above the melting temperature of the sealing metal, and this temperature is substantially maintained until the tube passes the third electrode 46. The drop in the temperature of the tube is indicated in dotted lines, as this drop in temperature may be relatively slow or fast, depending upon how the tube is cooled. The sealing metal is maintained in a molten condition from the electrode 33 to the electrode 46, and this gives the metal time to establish a bond with the strip stock, as by diffusion or alloying therewith, and gives the metal time to flow by capillary action or the like to fill in between juxta-positioned surfaces. For example, some of the metal will flow to fill in between the edges of the inner and outer plies of the structure shown in Fig. 12.

The electrodes may be adjusted to obtain the desired heating action. For instance, the tube is heated by resistance to the flow of electrical current therethrough. The distance between the electrodes is an important factor. By the turning of the handle 19 the first and second electrodes may be adjusted relative to the third electrode while remaining fixed relative to each other. By the turning of the handle 23 the first electrode may be adjusted relative to the second and third. The distance between the first and second electrodes may be adjusted and preferably is adjusted so that the tube is raised to the proper temperature; the distance between the second and third electrode is adjusted so that this temperature is maintained, the maintenance being essentially the input of sufficient energy to off-set heat losses.

Where a copper coated steel tube is desired the outer ply may be copper coated and the molten metal on the exterior of the tube and on the interior walls, for that matter, is given time to spread and diffuse with the steel. The same arrangement with the proper adjustments may be carried out with other metals for the strip and with other sealing metals.

It will be noted by reference to Fig. 2 that the first and third electrodes are connected to the same side of the secondary for the welding circuit and that the electrode 33 is connected to the opposite side; therefore, there is no electrical potential between the first and third electrodes. Accordingly, it is not necessary to insulate the first and third electrodes from the rest of the machine or to insulate the tube from the tube mill or any other part of the machine in advance of the first electrodes or any part of the machine on the outgoing side of the third electrodes. This facilitates machine construction, as there is no chance of shortage or a shunting of the current through parts of the machine or to the ground. All the current flows from the center electrode 33 to the first and third electrodes, or vice versa.

A tube as illustrated in Fig. 13 may be made in a similar manner, and the stock from which the tube is made may be coated with a sealing metal. Another way of carrying the sealing metal into position is by disposing a strip of sealing metal 80 between the plies of the tube, as illustrated in Fig. 14. This metal melts, and, due to the time period provided, flows in between all juxta-positioned surfaces of the plies and seams.

As fully set forth in a co-pending application, the portion of the outer ply adjacent the sealing metal 80 is under tension so that when the sealing metal melts, the space previously occupied is substantially closed by the portions of the plies coming together. Further detailed consideration of this particular point is not deemed necessary herein.

A still further way of carrying in the sealing metal is that of disposing the sealing metal loosely within the tube as shown in Fig. 15. The sealing metal, as illustrated at 81, is in the form of a wire, but it may take any other geometric shape or may be in powder form. The sealing metal may be carried into position for the tube shown in Fig. 13 in the manners illustrated in Figs. 14 and 15.

The electrodes 33 and 46 are preferably driven a little faster than the movement of the tube, and the grooves in the electrode 46 and roller 47 are preferably a little under size, as illustrated in Fig. 11. Therefore, there is a wiping or hot working action of the tube by these rollers, especially roller 46, the tendency being to work the metal and to apply pressure to the tube so that the plies and seams come closely together. In calculating the dimensions of the grooves consideration is to be given to the fact that the metal of the tube expands when heated.

A modified arrangement is illustrated in Figs.

6 and 7. The variation resides principally in the provision of two centrally disposed electrodes 33a and 33b connected on the same side of the welding circuit. These two electrodes are mounted in a housing 30a with a screw thread adjustment on the shaft. Otherwise the machine is like that shown in Fig. 1 and the same reference characters are applied to the other like parts. In this arrangement, the electrodes are connected into the circuit substantially the same as the manner heretofore described. The tube is preferably heated to its maximum point between the first electrode and the electrode 33a, and an adequate temperature is maintained from electrode 33b to the electrode 46. Inasmuch as no current flows in that section of the tube bridging electrode 33a and 33b, there will be a drop in the temperature at this location as illustrated. This form has the advantage of there being no potential between the first and last electrodes.

In the modified arrangement shown in Fig. 8 the organization of the electrodes is similar to that shown in Figs. 6 and 7. However, instead of connecting the electrodes into one circuit there are two welding circuits. The electrodes carry the same reference characters as are used in Fig. 7. One secondary circuit is connected across the first electrode 7—8 and electrode 33a; the other circuit is connected across the electrode 33b and the third electrode 46. Variations in the density of the current in the tube sections may be obtained by varying the transformers as well as by the mechanical adjustment features. This form does not have the advantage of there being no potential across the first and last electrodes, and therefore apparatus at the opposite ends of the welding unit should be insulated as shown at 85. The temperature curve, as illustrated, may be substantially the same as the curve shown in Fig. 7.

In Fig. 9 the electrode arrangement is like that of Fig. 2 but there are separate secondary circuits between the first and second electrode and between the second and third electrodes. With this arrangement the density of the current between first and second and second and third electrodes may be varied by variation of the current in the primary circuits, but this form does not have the advantage of no potential across the first and third electrodes. Therefore, the external apparatus, that is apparatus external to the fore and aft ends of the heating unit, must be insulated as diagrammatically illustrated at 85.

In Fig. 10 an arrangement is shown similar to Fig. 2, but here there is illustrated a different manner of adjustment in order to regulate the current density in a section. An element of magnetic material 86 may be disposed around a section, as for example, in the section between the second and third electrodes. This sets up a reactance so that the applied voltage is absorbed by the combined resistance and reactance of the circuit. This reactance may be varied to in turn govern the density of the current in this section of the tube.

The temperatures used, of course, are varied depending upon the metals employed. Where tube fashioned from steel strip is sealed with copper, the tube is preferably heated to a temperature from about 1200° C. to 1250° C., whereas the melting point of copper is about 1083° C. All factors must be coordinated as the input of electrical energy must be regulated relative to the speed of movement of the tube, the mass of the tube and the conductivity of the metal comprising the tube. Also, heat losses must be taken into consideration. In any event, the sections of tube bridging the electrodes are subjected to the electrical energy necessary to bring the temperature up to the desired point and for maintaining the temperature for the desired time.

In some of the claims appended hereto use is made of the terms "bond" or "bonding," in making reference to the uniting of the contiguous surfaces. This is to be construed to mean that the overlapping parts or juxtapositioned parts or contiguous surfaces are united in such a manner as to close or seal the tube. Use is also made of the term "contiguous"; this term is to be construed to mean the adjacent or abutting surfaces of the overlapping parts or plies, or the closely abutting edges of metal at a butt seam, or any other type of seam. The term "cuprous" used in some of the claims is to be construed to cover copper, bronze, brass, or other alloys or combination of metals containing copper. Where reference is made in the claims to "electrode means," as for example, by specifying first, second and third electrode means, this language is to be construed to cover a structure where an electrode means is a single element, as shown in Fig. 2, or a double element, as shown in Fig. 7.

Electric current passing through a section of tubing generates heat in an amount dependent on the value of the electrical current and the value of the electrical resistance of the tubing. The heat so generated raises the temperature of the tubing by an amount dependent on the quantity of heat, the mass of the tubing and the amount of heat dissipated from the tubing which latter amount is a function of the temperature of the tubing.

I claim:

1. In the method of making tube fashioned from strip metal stock having parts with contiguous surfaces, the steps of passing the tube, together with a supply of bonding metal, with longitudinal movement, passing an electric current longitudinally through successive sections of the moving tube of such a character as to heat the successive sections substantially to a bonding temperature of the bonding metal, and, before a substantial drop in the temperature, passing another electric current longitudinally through successive heated sections of the tube of such a character as to substantially maintain said bonding temperature through a time period for the uniting of the contiguous surfaces by the bonding metal.

2. In the method of making tube fashioned from strip steel stock having parts with contiguous surfaces, the steps of passing the tube with longitudinal movement together with a supply of cuprous bonding metal, passing electric current longitudinally through successive sections of the moving tube of such a character as to heat the successive sections to substantially melt the cuprous bonding metal, and, before a substantial drop in the temperature, passing another electric current longitudinally through successive heated sections of the moving tube of such a character as to substantially maintain said temperature through a time period for the uniting of the contiguous surfaces by the cuprous bonding metal.

3. In the method of making tube fashioned from strip metal stock having a coating of metal thereon which has a melting point lower than that of the strip stock and having parts with contiguous surfaces, the steps of passing the tube with longitudinal movement, passing electric current longitudinally through successive sections of the moving tube of such a character as to heat the successive sections to substantially melt the coating metal, and, before a substantial drop in the temperature, passing another electric current longitudinally through successive heated sections of the tube of such a character as to substantially maintain said melting temperature through a time period for the uniting of the coating metal to the exposed surfaces of the tube and for the bonding of the contiguous surfaces together by said coating metal.

4. In an apparatus for making tube fashioned from strip metal stock having contiguous surfaces to be united by the application of heat, means for moving the tube longitudinally, a plurality of electrodes for engaging the tube at longitudinally spaced points so that electrical current passes through successive sections of the tube to heat the same, the electrode means in engagement with the tube where the tube is in a hot condition comprising a roller having a groove for receiving the tube, said groove having dimensions somewhat smaller than those of the tube, and means for driving the roller electrode at a surface speed greater than the speed of movement of the tube longitudinally for hot working the tube.

5. In an apparatus for making tube fashioned from strip metal stock having contiguous surfaces to be united by the application of heat, means for moving the tube longitudinally, a plurality of electrodes for engaging the tube at longitudinally spaced points so that electrical current passes through successive sections of the tube to heat the same, the electrode means in engagement with the tube where the tube is in a hot condition comprising two rollers yieldingly pressed toward each other and grooved to define a passageway for the hot tube, said passageway having dimensions somewhat smaller than the exterior dimensions of the tube, and means for driving at least one of the rollers with a surface speed greater than the speed of longitudinal movement of the tube for hot working the tube.

6. In an apparatus for making tube fashioned from strip metal stock having contiguous surfaces to be united by the application of heat, means for moving the tube longitudinally, a plurality of electrodes for engaging the tube at longitudinally spaced points for the heating of successive sections by electrical resistance, one of the electrode means for engaging the tube at a point where the tube is in a heated condition comprising a metallic electrode roller and a carbon roller between which the tube moves.

7. In an apparatus for making tube fashioned from the strip metal stock having contiguous surfaces to be united by the application of heat, means for moving the tube longitudinally, a plurality of electrodes for engaging the tube at longitudinally spaced points for the heating of successive sections by electrical resistance, one of the electrode means for engaging the tube at a point where the tube is in a heated condition comprising a metallic electrode roller and a carbon roller between which the tube moves, and means for yieldingly holding the rollers in engagement with the tube.

BERT L. QUARNSTROM.